United States Patent [19]

Weyer et al.

[11] Patent Number: 5,395,959

[45] Date of Patent: Mar. 7, 1995

[54] ADJUSTMENT OF THE AVERAGE MOLECULAR WEIGHT OF POLYOXYALKYLENE GLYCOLS AND POLYOXYALKYLENE DERIVATIVES IN THE HETEROPOLYACID-CATALYZED POLYMERIZATION OF CYCLIC ETHERS AND/OR ACETALS WITH RING CLEAVAGE

[75] Inventors: Hans-Juergen Weyer, Mannheim; Rolf Fischer, Heidelberg; Gerhard Jeschek, Gruenstadt; Herbert Mueller, Frankenthal, all of Germany

[73] Assignee: BASF Aktiengesellschaft, Ludwigshafen, Germany

[21] Appl. No.: 110,297

[22] Filed: Aug. 20, 1993

Related U.S. Application Data

[63] Continuation of Ser. No. 843,808, Feb. 28, 1992, abandoned.

[30] Foreign Application Priority Data

Mar. 13, 1991 [DE]  Germany ............... 41 08 047.5

[51] Int. Cl.⁶ ............................................. C07C 69/02
[52] U.S. Cl. ............................................. 560/231
[58] Field of Search ................................. 560/231

[56] References Cited

U.S. PATENT DOCUMENTS 4,568,775  2/1986  Aoshima et al. ............. 568/617
5,099,074  1/1992  Mueller et al. .

Primary Examiner—José G. Dees
Assistant Examiner—Joseph M. Conrad, III
Attorney, Agent, or Firm—John H. Shurtleff

[57] ABSTRACT

The average molecular weight of polyoxyalkylene glycols and polyoxyalkylene glycol derivatives is adjusted in the heteropolyacid-catalyzed polymerization of cyclic ethers and/or acetals with ring cleavage in the presence of proton donors by a process in which the amount of the relevant proton donor present in the reaction system is regulated in the course of the reaction by the measurement of the electrical conductivity.

9 Claims, 2 Drawing Sheets

ADJUSTMENT OF THE AVERAGE MOLECULAR WEIGHT OF POLYOXYALKYLENE GLYCOLS AND POLYOXYALKYLENE DERIVATIVES IN THE HETEROPOLYACID-CATALYZED POLYMERIZATION OF CYCLIC ETHERS AND/OR ACETALS WITH RING CLEAVAGE

This application is a continuation of prior U.S. application Ser. No. 07/843,808, filed Feb. 28, 1992, and now abandoned.

The present invention relates to a process for adjusting the average molecular weight of polyoxyalkylene glycols and polyoxyalkylene derivatives in the heteropolyacid-catalyzed polymerization of cyclic ethers and/or acetals with ring cleavage in the presence of proton donors.

According to EP-A 126 471, EP-A 158 229 and U.S. Pat. No. 4,658,065, polyoxyalkylene glycols can be prepared by the heteropolyacid-catalyzed polymerization of cyclic ethers and/or acetals with ring cleavage in the presence of small amounts of water, and the water may be added as such to the reaction system or may be introduced into the latter by means of heteropolyacids containing water of crystallization.

Furthermore, polyoxyalkylene glycol derivatives, such as polyoxyalkylene glycol monoethers of monohydric alcohols or polyoxyalkylene glycol monoesters of monocarboxylic acids, can be synthesized by the heteropolyacid-catalyzed polymerization of cyclic ethers and/or acetals with ring cleavage in the presence of the relevant monohydric alcohols or monocarboxylic acids. These polyoxyalkylene glycol derivatives are particularly advantageously produced in the absence of water, i.e. using anhydrous reactants and heteropolyacid catalysts.

In the abovementioned reactions, as shown in Equation (1) which is typical for the polymerization of tetrahydrofuran (THF) with ring cleavage to give polyoxybutylene glycol (poly-THF) or poly-THF derivatives, formally 1 mol of the proton donor R-H is subjected to an addition reaction with the end of the polyoxyalkylene chain composed of n monomer units, with the result that the chain reaction of the polymerization with ring cleavage is finally terminated and the end product of the reaction is formed.

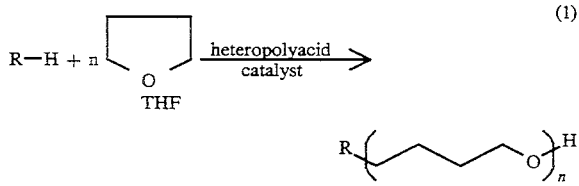

(1)

For the sake of simplicity, proton donors R-H are defined here and below as compounds R-H which, under the action of the heteropolyacid catalyst, formally undergo an addition reaction with the resulting polyoxyalkylene chain in such a way that the proton of the compound R-H is present at one end of said chain (hence the name) and the group R of the compound R-H is present at the other end. How this addition reaction actually takes place and which processes occur at the heteropolyacid catalyst are substantially unknown. The radical R of the proton donor R-H may be, for example, a hydroxyl group, any aliphatic, aromatic or araliphatic alcoholate group or any aliphatic, aromatic or araliphatic acyl group.

The content of proton donor R-H influences the phase behavior of the reaction mixture, the term reaction mixture or reaction system being understood here and below as meaning the reaction mixture consisting of monomer, proton donor R-H, heteropolyacid catalyst and, where relevant, a solvent which is inert under the reaction conditions. In the course of the reaction, of course, the polymer formed in the polymerization reaction becomes a further component of the reaction mixture. In the case of high contents of the compounds R-H, the reaction mixture forms a homogeneous phase, with the result that it may subsequently be difficult to separate off the catalyst during working up. Moreover, very high concentrations of proton donor R-H may result in an undesirable decline in the polymerization activity of the heteropolyacid catalyst. At very low proton donor contents of the reaction mixtures, the heteropolyacid is no longer completely dissolved. The abovementioned reactions are therefore advantageously carried out using contents of proton donor R-H which lead to the formation of a liquid two-phase system in the reaction mixture, the heavier, lower phase containing the major part of the heteropolyacid catalyst and substantial amounts of the proton donor R-H, in addition to monomeric starting material and freshly formed polymer, whereas the lighter upper phase is essentially composed of the monomeric starting material and polymer dissolved therein, in addition to residual amounts of proton donor and traces of catalyst.

Since formally the complete addition of the proton donor R-H at the polyoxyalkylene chain being formed causes chain termination in the polymerisation reaction, the ratio of the concentration of the heteropolyacid catalyst to that of the proton donor in the reaction mixture has a substantial effect on the average molecular weight of the resulting polymer. As a rule, it is therefore true that the higher the content of the compound R-H in the reaction mixture the lower is the average molecular weight of the resulting polymer. Accordingly, the average molecular weight of the polymer produced increases with a decrease in concentration of the proton donor R-H. Here and, unless stated otherwise, also below, the average molecular weight or average molecular mass is understood as being the number average molecular weight $M_n$, as obtained, for example, in the determination of the molecular weight by the methods of gel permeation chromatography, viscometry or osmometry.

The class of polyoxyalkylene glycols and of the stated polyoxyalkylene glycol derivatives which is of particular interest economically are polyethers whose average molecular weight is from about 500 to 3500 dalton. Such polyethers can be prepared in the 2-phase system described above. For many intended uses of the polyoxyalkylene glycols and polyoxyalkylene glycol derivatives, however, very pure compounds having defined properties, i.e. polyethers and polyether derivatives having certain average molecular weights and a very narrow molecular weight distribution, are desired in order to be able to be utilized as specific properties and to prepare mixtures having a defined composition and properties tailored for the particular intended use from various polymers having certain molecular weights.

However, it has been impossible to date to prepare polyoxyalkylene glycols and polyoxyalkylene glycol derivatives having certain average molecular weights in a controlled manner by the hetero polyacid-catalyzed polymerization of cyclic ethers and/or acetals with ring cleavage. Since, moreover, there is no method for continuously measuring and controlling the concentration ratios of the reactants in the reaction mixture and in particular of the proton donor R-H in the catalyst phase over the course of the reaction, it has also been impossible to date to produce such polyoxyalkylene glycols and polyoxyalkylene glycol derivatives having a very narrow molecular weight distribution.

It is an object of the present invention to provide a reliable, reproducible, simple and robust process which makes it possible to regulate the content of proton donor R-H in the reaction system and in particular in the catalyst phase and thus permits the average molecular weight to be controlled in the preparation of polyoxyalkylene glycols and of the stated polyoxyalkylene glycol derivatives in the heteropolyacid-catalyzed polymerization of cyclic ethers and/or acetals with ring cleavage. The process should be capable of measuring and controlling the content of proton donor R-H sufficiently rapidly and accurately to enable a certain average molecular weight to be achieved simultaneously with a narrow molecular weight distribution of the resulting polymer in a controlled manner even in the continuous preparation of the relevant polyether compounds. Furthermore, the process should be universally applicable, i.e. it should enable a desired average molecular weight to be obtained in a controlled manner in the reaction systems differing with regard to the type of the particular monomers used and, where relevant, the comonomers, heteropolyacid catalysts and proton donors R-H.

BRIEF DESCRIPTION OF THE DRAWINGS

FIG. I shows the relationship between the molecular weight of the instant polymer and its conductivity.

Figure 1:
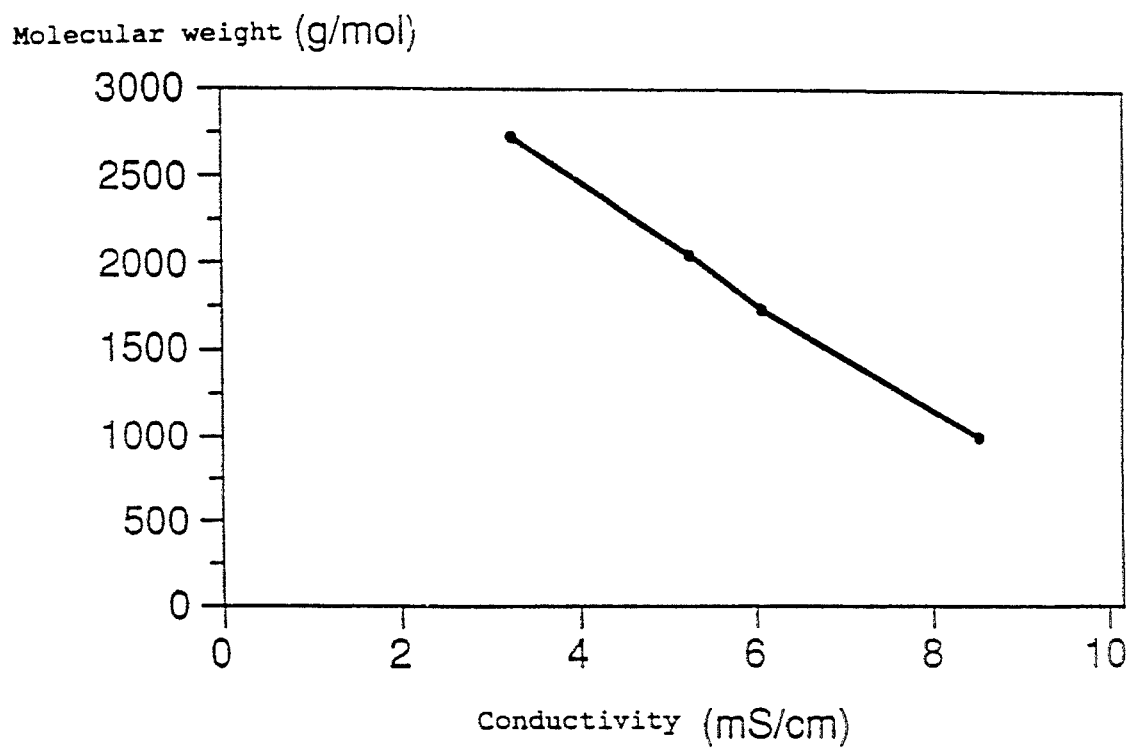
Figure 2:
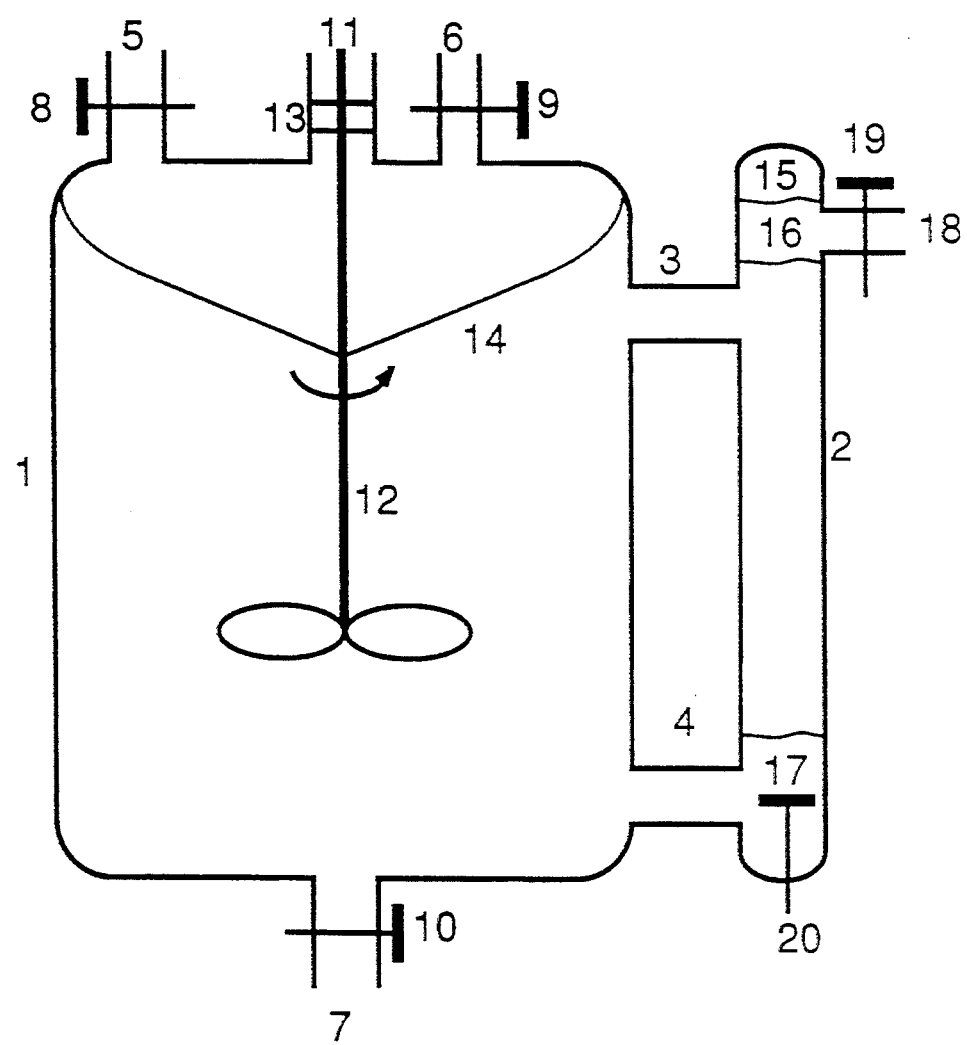
FIG. 2 shows the apparatus used to carry out the instant process.

We have found that this object is achieved by a process for adjusting the average molecular weight of polyoxyalkylene glycols and polyoxyalkylene glycol derivatives in the heteropolyacid-catalyzed polymerization of cyclic ethers and/or acetals with ring cleavage in the presence of proton donors, wherein the amount of the relevant proton donor present in the reaction system is regulated in the course of the reaction by the measurement of the electrical conductivity.

It has thus been found that the ratio of proton donor R-H to heteropolyacid catalyst in the reaction system and in particular in the catalyst phase has a measurable effect on the electrical conductivity of the reaction system or of the catalyst phase, so that it is possible continuously to measure and to control the proton donor/heteropolyacid ratio in the reaction system as a whole and in the catalyst phase in particular. It has also been found that the electrical conductivity of the catalyst phase can be correlated with the average molecular weight of the resulting polymer, and it is therefore possible, by adjusting and maintaining a certain value for the electrical conductivity in the reaction system or in the catalyst phase, to establish the average-molecular weight of the resulting polymer in a controlled manner in the course of the polymerization reaction, while maintaining a narrow molecular weight distribution. Consequently, the value for the electrical conductivity in the reaction system and in particular in the catalyst phase can be controlled by the addition of fresh proton donor R-H or, conversely, the addition of fresh proton donor to the reaction mixture and the content of proton donor R-H in the reaction mixture and in particular in the catalyst phase, and hence also the average molecular weight of the resulting polymer, can be regulated by the measurement of the electrical conductivity of the reaction mixture and in particular of the catalyst phase.

Measurement of the electrical conductivity can be carried out in the novel process, for example, with the aid of the techniques, circuits and measurement arrangements as described by T. and L. Shedlovsky in A. Weissberger, B. W. Rossiter (Ed.) Techniques of Chemistry, Volume I, pages 163–204, Wiley-Interscience, New York, 1971. The commercially available apparatuses and electrodes for conductivity measurement can also be successfully used as conductivity measuring apparatuses and conductivity measuring cells in the novel process. The conventional platinum electrodes can be used as measuring electrodes. In continuous operation, the electrodes may become coated with polymer or by-products of the polymerization reaction in the course of time and the measured values may thus be falsified. It is therefore expedient to check the function of the electrodes from time to time and, if necessary, to clean the electrodes.

The conductivity can be measured in the homogeneous reaction mixture. In carrying out the polymerization reaction in the 2-phase system essentially consisting of monomer- and product-containing upper phase and catalyst phase, the electrical conductivity is preferably measured in the liquid catalyst phase.

The concentration of the relevant proton donor R-H in the catalyst phase can simply be determined with the aid of the conductivity measurement obtained, using a calibration curve prepared beforehand under defined conditions. As a rule, it is advantageous to prepare individual calibration curves for the different proton donor/heteropolyacid systems, taking into account the reaction temperature to be used in the polymerization reaction. Metering of the proton donor R-H to the reaction mixture can then be controlled by a comparison of the actual value and the setpoint value of the measured electrical conductivity. This control of the metering apparatus can be automated in a conventional manner with the aid of known, for example electronic, controllers, making it possible continuously to control the addition of the proton donor R-H to the reaction mixture.

In preparing the calibration curves, it should be noted that the conductivity of the catalyst phase generally increases with increasing content of proton donor R-H until the catalyst phase has dissolved homogeneously in the reaction mixture. When a one-phase, homogeneous reaction system is formed, the value of the electrical conductivity generally substantially decreases in comparison with the electrical conductivity measured in the catalyst phase.

Apart from being correlated with the content of the proton donor R-H in the catalyst phase, the electrical conductivity in the catalyst phase can also be correlated with the average molecular weight of the resulting polymer. Taking into account the particular heteropolyacid used, the proton donor used, the monomer used and the polymerization temperature used, there is a virtually linear relationship between the measured electrical conductivity and the average molecular weight of the polymer formed. Such a relationship is shown by way of example for the reaction system dodecatungsto-phosphoric acid/tetrahydrofuran/water at a polymerization temperature of 60° C. in FIG. I.

Summarizing the above, according to the invention the average molecular weight of the polyalkylene glycols or polyalkylene glycol derivatives to be prepared, in the heteropolyacid-catalyzed polymerization of cyclic ethers and/or acetals with ring cleavage in the presence of proton donors, is adjusted so that, for the particular polymerization system used, consisting essentially of cyclic ether and/or acetal, proton donor and heteropolyacid, the correlation between the measured conductivity in the polymerization system, preferably in its catalyst phase, and the average molecular weight of the resulting polymer and the content of proton donor in the polymerization mixture is determined at the particular polymerization temperature used, for example by setting up a calibration curve, a mathematical equation or an algorithm, and the conductivity thus determined and required for obtaining a polymer having a certain average molecular weight is kept substantially constant in the polymerization system used during the course of the polymerization reaction by continuously metering into the polymerization mixture the amount of proton donor required to keep the conductivity constant, so that the content of proton donor is likewise kept substantially constant over the course of the polymerization reaction. In short, this means that the amount of the relevant proton donor present in the reaction system is regulated during the course of the reaction by measuring the electrical conductivity.

The novel process is practically generally suitable for adjusting the average molecular weight of the resulting polymers in the preparation of polyoxyalkylene glycols and polyoxyalkylene glycol derivatives by the heteropolyacid-catalyzed polymerization of cyclic ethers and/or acetals with ring cleavage.

For example, the following monomers can be used for the preparation of the stated polymers: ethylene oxide, propylene oxide and other substituted epoxides, such as epichlorohydrin, 1,2-butylene oxide, 2,3-butylene oxide, isobutylene oxide, oxetane and oxetane derivatives, such as 3,3-dimethyloxetane and 3,3-bis-chloromethyloxetane, 5-membered cyclic ethers and acetals, such as tetrahydrofuran, methyltetrahydrofurans and 1,3-dioxolane, 6-membered cyclic ethers, such as tetrahydrofuran, 1,4-dioxane, 1,3-dioxane and trioxane, 7-membered and higher-membered cyclic ethers, such as oxepan, crown ethers and cyclic oligomers of tetrahydrofuran. These monomers can be converted into homopolymers, but it is also possible to copolymerize mixtures of these monomers.

In the preparation of copolymeric polyoxyalkylene glycols, comonomers from the group consisting of the diols, triols and polyols may additionally be polymerized into the polyoxyalkylene chain. Examples of these are the following alcohols: ethylene glycol, propylene glycol, 1,4-butanediol, neopentyl glycol, 1,6-hexanediol, glycerol, xylitol, sorbitol and mannitol. As a rule, these comonomers are randomly distributed in the polymer chain. Of course, these polyhydric alcohols mentioned here in connection with their function as comonomers simultaneously act as proton donors R-H.

In the copolymerization of these polyhydric alcohols with the other monomers, water is inevitably eliminated from the polyhydric alcohols and likewise acts as proton donor R-H. Because of these complicated conditions in the reaction system, the novel process has an advantageous effect in the controlled preparation of copolymers of cyclic ethers and polyhydric alcohols having a certain average molecular weight and a narrow molecular weight distribution.

Water, monohydric alcohols and monocarboxylic acids may be used as proton donors R-H. If water is employed as the proton donor, the product of the polymerization reaction is a polyoxyalkylene glycol, polyoxyalkylene glycol monoethers are formed when monohydric alcohols are used and, when monocarboxylic acids are added, the relevant monocarboxylic acid esters of the polyoxyalkylene glycols are formed.

For the preparation of polyoxyalkylene glycols, the proton donor water is used as a rule in amounts of from 0.1 to 15, preferably 1 to 8, mol/mol of heteropolyacid, depending on the desired average molecular weight of the polyether glycol. These values also apply when polyhydric alcohols are concomitantly used as comonomers for the preparation of the polyoxyalkylene glycols.

For the preparation of polyoxyalkylene glycol monoethers, it is possible in principle to use all types of monohydric alcohols, for example aliphatic, cycloaliphatic, aromatic or araliphatic alcohols. However, $C_1$–$C_{18}$-alcohols and benzyl alcohols are preferably used, particularly preferably aliphatic $C_1$–$C_8$-alcohols. For example, the following monohydric alcohols can be used in the novel process: methanol, ethanol, n-butanol, tert-butanol, octan-1-ol, octadecan-1-ol, cyclohexanol, crotyl alcohol, benzyl alcohol and phenol. The monohydric alcohols are added to the reaction mixture in general in amounts of from 0.1 to 15, preferably from 1 to 8, mol/mol of heteropolyacid.

For the preparation of polyoxyalkylene glycol monoesters of monocarboxylic acids, aliphatic, cycloaliphatic, aromatic and araliphatic carboxylic acids can be used. Aliphatic $C_1$–$C_{18}$-monocarboxylic acids and benzoic acid, in particular $C_1$–$C_4$-monocarboxylic acids, such as formic acid, acetic acid, propionic acid, butyric acid, acrylic acid or methacrylic acid, are preferably used. Advantageously, the contents of carboxylic acid in the reaction mixture are from 0.1 to 15, preferably from 1 to 8, mol of monocarboxylic acid/mol of heteropolyacid.

If the reaction mixture contains the abovementioned amounts of the particular electron donor R-H, as a rule the abovementioned system of two liquid phases forms, in which system polyoxyalkylene glycols and the relevant polyoxyalkylene glycol derivatives having mean molecular weights of from about 500 to about 3500 can be particularly advantageously prepared.

For the purposes of the present invention, heteropolyacids are inorganic polyacids which have two or more different central atoms and are formed from weak, polybasic oxo acids of a metal, preferably from the oxo acids of chromium, of molybdenum, of vanadium or of tungsten and/or the corresponding oxides of these metals $CrO_3$, $MoO_3$, $V_2O_5$ or $WO_3$ and the oxide of another metal or nonmetal, for example arsenic, boron, iodine, phosphorus, selenium, silicon, germanium or tellurium, as mixed, partial anhydrides. As a rule, the atomic ratio of the first-mentioned to the last-mentioned elements in these heteropolyacids is from 2.5 to 12, preferably 9 or 12.

Examples of heteropolyacids which can be used in the novel process are the following compounds: dodecamolybdatophosphoric acid ($H_3PMo_{12}O_{40}$ · $nH_2O$), dodecamolybdatosilicic acid ($H_4SiMo_{12}O_{40}$ · $nH_2O$), dodecamolybdatoceric(IV) acid ($H_8CeMo_{1-}$ $2O_{42} \cdot nH_2O$), dodecamolybdatoarsenic(V) acid ($H_3AsMo_{12}O_{40} \cdot nH_2O$), hexamolybdatochromic(III) acid ($H_3CrMo_6O_{24}H_6 \cdot nH_2O$), hexamolybdatonickelic(II) acid ($H_4NiMo_6O_{24}H_6 \cdot 5H_2O$), hexamolybdatoiodic acid ($H_5IMo_6O_{24} \cdot nH_2O$), octadecamolybdatodiphosphoric acid ($H_6P_2Mo_{18}O_{62} \cdot 11 H_2O$), octadecamolybdatodiarsenic(V) acid ($H_6As_2Mo_{18}O_{62} \cdot 25 H_2O$), nonamolybdatomanganic (IV) acid ($H_6MnMo_9O_{32} \cdot nH_2O$), undecamolybdatovanadatophosphoric acid ($H_4PMo_{11}VO_{40}^e \cdot nH_2O$), decamolybdatodivanadatophosphoric acid ($H_5Mo_{10}V_2O_{40} \cdot nH_2O$), dodecavanadatophosphoric acid ($H_7PV_{12}O_{36} \cdot nH_2O$), dodecatungstosilicic acid ($H_4SiW_{12}O_{40} \cdot 7 H_2O$), dodecatungstophosphoric acid ($H_3PW_{12}O_{40} \cdot nH_2O$), dodecatungstoboric acid ($H_5BW_{12}O_{40} \cdot nH_2O$), octadecatungstodiphosphoric acid ($H_6P_2W_{18}O_{62} \cdot 14 H_2O$), octadecatungstodiarsenic(V) acid ($H_6As_2W_{18}O_{62} \cdot 14 H_2O$) and hexamolybdatohexatungsto- phosphoric acid ($H_3PMo_6W_6O_{40} \cdot nH_2O$). Of course, mixtures of heteropolyacids can also be used. In the novel process, dodecatungstophosphoric acid, dodecamolybdatophosphoric acid, nonamolybdatophosphoric acid, dodecamolybdatosilicic acid and dodecatungstosilicic acid are preferably used because they are readily obtainable.

The heteropolyacids and their salts are known compounds and can be prepared by known processes, for example by the methods of Brauer (Editor): Handbuch der Präparativen, Anorganischen Chemie, Volume III, Enke, Stuttgart, 1981, p. 1774–1798, or by the method described in Top. Curr. Chem. 76 (1978), 1.

The heteropolyacids prepared in this manner are generally in hydrated form and, before being used as a catalyst in the process for the preparation of polyoxyalkylene glycols, are freed from coordinately bound water present therein to such an extent as to obtain the ratio of the concentration of the proton donor water to that of the heteropolyacid catalyst that is desirable for the reaction in question. For use as catalysts for the preparation of polyoxyalkylene glycol monoethers or polyoxyalkylene monoesters, the heteropolyacids are preferably completely dehydrated. This dehydration can advantageously be carried out thermally, for example by the method described in Makromol. Chem. 190, (1989) 929. Depending on the heteropolyacid used, another possible method for dehydrating the heteropolyacids comprises dissolving it in an organic solvent, for example in a dialkyl ether or alcohol, displacing the water with the organic solvent from its coordinate bond with the heteropolyacid and distilling off the water azeotropically with the solvent.

The preparation of the polyoxyalkylene glycols and of the stated polyoxyalkylene glycol derivatives can be carried out both continuously and batchwise. Advantageously, the heteropolyacid is used for this purpose in amounts of from 10 to 300, preferably from 50 to 150, parts by weight per 100 parts by weight of the monomer used. It is also possible to add larger amounts of heteropolyacid to the reaction mixture.

The heteropolyacid can be added to the reaction in solid form, after which it is gradually solvated as a result of being brought into contact with the other reactants, with formation of the liquid catalyst phase. However, it is also possible to adopt a procedure in which the solid heteropolyacid is made into a slurry with the proton donor to be used and/or the monomer to be employed and the resulting catalyst solution is passed into the reactor as the liquid catalyst phase. Both the catalyst phase and the monomeric starting material may be initially charged into the reactor. However, it is also possible for both components to be passed simultaneously into the reactor.

The polymerization is usually carried out at from 0° to 150° C., preferably from 30° to 80° C. Atmospheric pressure is advantageously employed; with the reaction under superatmospheric pressure, mainly under the autogenous pressure of the reaction system, may also prove advantageous, particularly if readily volatile monomers are used.

As the polymerization is preferably carried out in a 2-phase system, it is essential to ensure thorough mixing of the two phases. For this purpose, it is necessary for the reactors to be equipped with efficient mixing apparatuses, for example stirrers, both in the batchwise and in the continuous procedure. In the batchwise process, a stirred kettle is generally used for this purpose, the two liquid phases being separated from one another in a conventional manner after the end of the reaction.

However, the continuous procedure is preferably used. The reaction can be carried out in conventional reactors or reactor arrangements suitable for continuous processes, for example in tube reactors which are equipped with baffles which ensure thorough mixing of the 2-phase system, or in stirred kettle cascades, the reaction being followed by continuous separation of the catalyst phase from the monomer- and product-containing upper phase. An apparatus as shown schematically in FIG. II is advantageously used in the novel process.

This apparatus is a stirred kettle 1 which is combined with a phase separator 2 which is otherwise of conventional design and may be equipped with either an outer or an inner heating means and is provided with generally separate inlet connections 5 for feeding in the individual reactants and flushing with inert gas. In FIG. II, for the sake of clarity the kettle heating is not shown and only one inlet connection 5, representing all others, is drawn. Furthermore, an apparatus for pressure equilibration 6 and an outlet connection 7 are mounted on the reactor. All these apparatuses are provided with separate control apparatuses 8, 9 and 10, for example slide valves or valves, which permit opening and closing of these connections and regulation of the feed. The reactor is provided with a stirrer 12 which is connected to the outside by the guide 11 sealed with the bush 13. The stirred kettle 1 is connected to the phase separator 2 via the feeds 3 and 4 mounted substantially at the height of the upper or lower third. The product solution obtained in the reaction is removed from the apparatus via the outlet connection 18, which is advantageously mounted above the feed 3. The outflow of the product solution is regulated by the control apparatus 19, which may be, for example, a slide valve or a valve.

To operate this continuous apparatus, the reactants are initially taken in the reactor and thoroughly mixed at the desired temperature by means of stirrer 12, an emulsion-like mixture of the catalyst phase and the upper phase being formed. The flow produced in the reaction mixture by the stirrer causes the emulsion-like mixture to pass via feed 3 into the phase separator 2, in which the catalyst phase and the monomer- and product-containing upper phase separate owing to their different densities. The clear, colorless, product-containing upper phase and the clear catalyst phase, whose color depends on the heteropolyacid used, separate out from the turbid, emulsion-like reaction mixture, roughly above the dashed line 16 and below the dashed line 17.

The product phase is taken off via outlet 18, while the catalyst phase flows back into the stirred kettle via the feed 4 owing to the suction generated by the stirrer 12 and is thoroughly mixed with the monomer- and product-containing upper phase there. The lines 14 and 15 denote the rough liquid meniscus or liquid level in the stirred kettle and the phase separator, respectively, during operation. Fresh monomer and fresh proton donor R-H are introduced into the stirred kettle via the filling connection 5. The proton donor feed is controlled with the aid of the conductivity measuring cell 20 immersed in the liquid catalyst phase in such a way that the desired proton donor content in the catalyst phase remains constant within the accuracy of control.

Fresh monomer is usually metered into the reactor under control by a level controller. Fresh monomer is advantageously fed in at the rate at which product and unconverted monomer are discharged from the reaction apparatus. In general, the polymerization is carried out for from 0.5 to 50 h, preferably from 1 to 10 h, particularly preferably from 1 to 8 h, depending on the amount of catalyst and on the reaction temperature in the batchwise process. In the continuous process, as a rule residence times of from 0.5 to 20 h, preferably from 1 to 8 h, particularly preferably from 2 to 5 h, are established. At the beginning of the continuous reaction, the reaction system described requires a certain time before a steady-state equilibrium has been established and, during this time, it may be advantageous to keep outlet 18 closed with the aid of control apparatus 19, ie. to discharge no product solution from the reaction apparatus.

The catalyst phase remains in the reaction apparatus and is continuously replenished according to the catalyst losses which occur as a result of the discharge of small amounts of catalyst with the product-containing upper phase, replenishing being effected by feeding in fresh catalyst and/or by recycling the discharged catalyst.

Where a system of two liquid phases is present, the electrical conductivity is advantageously measured in the catalyst phase.

Since, when working in the 2-phase system described, the reaction mixture forms a type of emulsion owing to the thorough mixing of the two phases, in order to obtain reproducible measurements the conductivity measuring cell is advantageously installed in the calm zones of the reactor in which zones the catalyst phase has separated from the monomer- and product-containing upper phase. One possibility for arranging the conductivity measuring cell is shown by way of example in FIG. II for the continuous procedure. In the batchwise process, the electrical conductivity can be measured point by point by switching off the stirring at certain time intervals and measuring the conductivity after the heavier catalyst phase has settled out. In the batchwise process, an apparatus which may advantageously be used is one whose design substantially corresponds to that of the apparatus shown in FIG. II, in which however the phase separator 2 has been replaced by a measuring tube which is of comparatively smaller dimensions and through which the reaction mixture can circulate, separation of the two liquid phases occurring, as shown in FIG. II. When such an apparatus is used, the conductivity can also be measured continuously in the batchwise process for the preparation of polyoxyalkylene glycols and polyoxyalkylene glycol derivatives.

The preparation of the polyether derivatives described is advantageously carried out under an inert gas atmosphere, and any inert gases, such as nitrogen or argon, may be used. Before they are used, the cyclic ethers are advantageously freed from any peroxides present therein. For the preparation of polyoxyalkylene glycol monoethers and polyoxyalkylene glycol monoesters, anhydrous monomers and proton donors are preferably used.

The addition of organic solvents which are inert under the reaction conditions, for example aliphatic and aromatic hydrocarbons and halohydrocarbons, is possible and may have an advantageous effect in that the phase separation of the catalyst phase and the upper phase is facilitated. As a rule, the monomer serves both as a reactant and as a solvent.

The polymer-containing upper phase can be worked up, for example, by neutralizing traces of heteropolyacid present therein by adding a base, for example an alkali metal or alkaline earth metal hydroxide solution, ammonia, an alkali metal or alkaline earth metal carbonate solution or a bicarbonate solution, distilling off the monomer present therein and filtering the polyether compound remaining in the distillation residue, in order to separate off precipitated salts. The monomer recovered in the distillation can of course be recycled to the reaction.

The novel process makes it possible for the first time to prepare polyoxyalkylene glycols, polyoxyalkylene glycol monoethers and polyoxyalkylene glycol monoesters having certain average molecular weights in a controlled manner and with a narrow molecular weight distribution by means of the heteropolyacid-catalyzed polymerization of cyclic ethers and/or acetals with ring cleavage in the presence of the corresponding proton donors R-H.

Polyoxyalkylene glycols have a wide range of uses, and their use in hydraulic oils or as diol component in the preparation of polyurethanes is mentioned here merely by way of example. Polyoxyalkylene glycol monoethers, in particular poly-THF monoethers, are used, for example, for the preparation of special polyurethanes (JP-A-105 029/1988) and are also employed for special lubricating oils (EP-A-336 171), as additives for engine oils (JP-A-159 411/1979) and as spinning oils (JP-A-211 371/1988). Polyoxyalkylene glycol monoesters are used, for example, as plasticizers (U.S. Pat. No. 4,482,411, impregnating agents (DE-A-29 32 216), monomers (EP-A-286 454), emulsifiers and dispersants (JP-A-138 452/1987) and for deinking in the recycling of waste paper (JP-A-303 190/1988).

EXAMPLES

The average molecular weight ($M_n$) of the polymers prepared according to the examples was determined by means of gel permeation chromatography, a standardized polystyrene being used for calibration. The number average molecular weight $M_n$ was calculated from the resulting chromatograms according to the equation $$M_n = \frac{\Sigma c_i}{\Sigma \frac{c_i}{M_i}}$$

where $c_i$ is the concentration of the individual polymer species i in the polymer mixture obtained and $M_i$ is the molecular weight of the individual polymer species i. The molecular weight distribution, referred to below as dispersity D, was calculated from the ratio of the weight average molecular weight ($M_w$) to the number average molecular weight ($M_n$), according to the equation $$\frac{M_w}{M_n} = D$$

The weight average molecular weight $M_w$ was determined from the resulting chromatograms with the aid of the formula $$M_w = \frac{\Sigma c_i M_i}{\Sigma c_i}$$

The samples used for determining the dispersity were not, as generally the case, subjected to prior molecular distillation to remove volatile, short-chain polymers, and the D value determined was therefore higher than would be expected after a molecular distillation.

Example 1

1000 g of THF, 38 g of water and 500 g of dodecatungstophosphoric acid were heated at 60° C. for 4 hours in an argon atmosphere and with vigorous stirring in an apparatus according to FIG. II. The electrical conductivity of the catalyst phase was measured in the stabilization zone, where the liquid catalyst phase separated from the organic phase. Thereafter, 250 g/hour of THF and an amount of water sufficient to give a conductivity of 8.3 mS/cm were metered in over a further 100 hours. During this time, the same amount of organic phase was removed from the apparatus. The readily volatile constituents of the organic phase, such as THF and water, were then distilled off under reduced pressure. The THF conversion was 8%. The poly-THF formed had a molecular weight of 1000, determined by the method of hydroxyl group determination (Deutsches Arzneimittelbuch, 7th Edition, Chapter V 3.4.3.). Its dispersity D was 1.8.

Example 2

Example 2 was carried out in the same way as in Example 1, except that 19 g of water were added at the beginning and the conductivity was kept at 6.0 mS/cm during the experiment. The THF conversion was 20%. The poly-THF formed had a molecular weight of 1800, determined by the method of hydroxyl group determination. Its dispersity D was 1.9.

Example 3

This experiment was carried out in the same way as in Example 1, except that 14 g of water were added at the beginning and the electrical conductivity was kept at 3.6 mS/cm during the experiment. The THF conversion was 28%. The poly-THF formed had a molecular weight of 2400, determined by the method of hydroxyl group determination. Its dispersity D was 1.6.

Example 4

1000 g of THF, 38 g of anhydrous methanol and 500 g of anhydrous dodecatungstophosphoric acid were heated at 60° C. for 4 hours in an argon atmosphere with vigorous stirring in an apparatus according to FIG. II, electrical conductivity of the catalyst phase being measured in the stabilization zone where the liquid catalyst phase separated from the organic phase. Thereafter, 250 g/hour of THF and an amount of methanol sufficient to give a conductivity of 5.9 mS/cm were metered in over a further 100 hours. During this time, the same amount of organic phase was removed from the apparatus. The readily volatile constituents of the organic phase, such as THF and methanol, were then removed in the course of a distillation under reduced pressure. The THF conversion was 18%. The poly-THF monomethyl ether formed had an average molecular weight ($M_n$) of 2150. Its dispersity D was 1.7.

Example 5

This experiment was carried out in the same way as in Example 4, except that 55 g of tert-butanol were added at the beginning and the conductivity was kept at 4.3 mS/cm during the experiment by adding further tert-butanol. The THF conversion was 13%. The poly-THF monotert-butyl ether formed had an average molecular weight ($M_n$) of 1900. Its dispersity D was 1.7.

Example 6

1000 g of THF, 50 g of formic acid and 500 g of anhydrous dodecatungstophosphoric acid were heated at 60° C. for 4 hours in an argon atmosphere and with vigorous stirring in an apparatus according to FIG. II, the electrical conductivity of the catalyst phase being measured in the stabilization zone where the liquid catalyst phase separated from the organic phase. Thereafter, 250 g/hour of tetrahydrofuran and an amount of formic acid sufficient to give a conductivity of 5.7 mS/cm were metered in over 100 hours. During this time, the same amount of organic phase was removed from the reaction apparatus. The readily volatile constituents of the organic phase, such as THF and formic acid, were then removed in the course of a distillation under reduced pressure. The THF conversion was 17%. The poly-THF monoformate formed had an average molecular weight ($M_n$) of 1700. Its dispersity D was 1.8.

Example 7

This experiment was carried out in the same way as in Example 6, except that 90 g of glacial acetic acid were added at the beginning and the electrical conductivity of the catalyst phase was kept at 5.0 mS/cm during the experiment by adding further acetic acid. The THF conversion was 22%. The poly-THF monoacetate formed had an average molecular weight ($M_n$) of 1900. Its dispersity D was 1.7.

Example 8

200 g of THF, 5 g of glacial acetic acid and 100 g of anhydrous dodecatungstosilicic acid were heated at 60° C. in an argon atmosphere and with vigorous stirring in a glass flask provided with a stirrer and reflux condenser. The conductivity of the catalyst phase was brought to 0.9 mS/cm during this time. The reaction mixture was worked up as described above. The THF conversion was 10%. The poly-THF monoacetate formed had an average molecular weight of 2800.

Example 9

200 g of THF, 10 g of glacial acetic acid and 100 g of anhydrous dodecatungstosilic acid were heated at 60° C. for 4 hours in an argon atmosphere and with vigorous stirring in a reaction apparatus according to FIG. II, the electrical conductivity in the catalyst phase being brought to 2.5 mS/cm. The reaction mixture was worked up as described above. The THF conversion was 17%. The poly-THF monoacetate formed had an average molecular weight of 2400.

We claim:

1. In a process for the heteropolyacid-catalyzed polymerization of a monomeric reactant selected from the group consisting of cyclic ethers, acetals and mixtures thereof, with ring cleavage in the presence of a proton donor to produce a polymer which is a polyoxyalkylene glycol or a derivative thereof, the improvement for adjusting and maintaining the average molecular weight of said polymer to a substantially constant value, which comprises:

setting up a calibration curve, or its equivalent mathematical equation or algorithm, for the particular polymerization system containing a specific monomeric reactant, a specific proton donor and a specific heteropolyacid, to establish the correlation between the measured electrical conductivity in said polymerization system, based upon the content of said proton donor in the catalyst phase of the reaction mixture, and the average molecular weight of the resulting polymer at a particular polymerization reaction temperature; and then carrying out said polymerization for this particular polymerization system and reaction temperature by continuously measuring the conductivity of said system during the reaction and, as determined by the calibration curve established for said system, and continuously metering an amount of said proton donor into the polymerization mixture to keep the conductivity substantially constant over the entire course of the polymerization reaction.

2. A process as claimed in claim 1, wherein the polymerization is carried out in a 2-phase liquid system consisting essentially of (1) a monomer- and product-containing upper phase and (2) a catalyst containing lower phase, and the content of the proton donor in the lower catalyst phase is kept substantially constant by the measurement of the electrical conductivity of the catalyst phase.

3. A process as claimed in claim 2, wherein for the preparation of polyoxyalkylene glycols where the proton donor is water, the content of said water in the lower catalyst phase is kept substantially constant by the measurement of the electrical conductivity of the catalyst phase.

4. A process as claimed in claim 2, wherein for the preparation of polyoxyalkylene glycol monoethers of monohydric alcohols where the proton donor is a monohydric alcohol, the content of said monohydric alcohol in the lower catalyst phase is kept substantially constant by the measurement of the electrical conductivity of the catalyst phase.

5. A process as claimed in claim 2, wherein for the preparation of polyoxyalkylene glycol monoesters of monocarboxylic acids where the proton donor is a monocarboxylic acid, the content of said monocarboxylic acid in the lower catalyst phase is kept substantially constant by the measurement of the electrical conductivity of the catalyst phase.

6. A process as claimed in claim 2, wherein the process is carried out continuously.

7. A process as claimed in claim 1, wherein the polymerization is carried out to produce a polymer having an average molecular weight of from about 500 to 3,500 dalton.

8. A process as claimed in claim 1, wherein the process is carried out continuously.

9. A process as claimed in claim 1, wherein the polymerization is carried out to produce a polymer having an average molecular weight of from about 500 to 3,500 dalton.

* * * * *

UNITED STATES PATENT AND TRADEMARK OFFICE
CERTIFICATE OF CORRECTION

PATENT NO. : 5,395,959

DATED : March 7, 1995

INVENTOR(S) : Weyer et al.

It is certified that error appears in the above-identified patent and that said Letters Patent is hereby corrected as shown below:

Column 14, line 27 : after "A process as claimed in claim", replace "1" with --2--.

Signed and Sealed this

Thirteenth Day of June, 1995

*Attest:*

BRUCE LEHMAN

*Attesting Officer*   *Commissioner of Patents and Trademarks*